United States Patent
Yilmaz

(10) Patent No.: US 9,116,586 B2
(45) Date of Patent: Aug. 25, 2015

(54) UNIFORM-DENSITY COPLANAR TOUCH SENSOR

(71) Applicant: Esat Yilmaz, Santa Cruz, CA (US)

(72) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 39 days.

(21) Appl. No.: 13/713,995

(22) Filed: Dec. 13, 2012

(65) Prior Publication Data

US 2014/0168092 A1    Jun. 19, 2014

(51) Int. Cl.
*G06F 3/045* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC .......... G06F 3/044; G06F 2203/04112; G06F 2203/04111
USPC ................ 345/173, 174; 200/600; 178/18.01, 178/18.03, 18.06
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,493,331 B2 * | 7/2013 | Krah et al. | 345/173 |
| 8,723,824 B2 | 5/2014 | Myers | |
| 2008/0309635 A1 | 12/2008 | Matsuo | |
| 2009/0219257 A1 * | 9/2009 | Frey et al. | 345/173 |
| 2009/0315854 A1 | 12/2009 | Matsuo | |
| 2010/0164889 A1 * | 7/2010 | Hristov et al. | 345/173 |
| 2011/0102361 A1 * | 5/2011 | Philipp | 345/174 |
| 2011/0102370 A1 * | 5/2011 | Kono et al. | 345/174 |
| 2012/0194441 A1 * | 8/2012 | Frey | 345/173 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Koosha Sharifi-Tafreshi
(74) *Attorney, Agent, or Firm* — Baker Botts L.L.P.

(57) ABSTRACT

In one embodiment, an apparatus includes one or more drive electrodes and one or more sense electrodes of a touch sensor. Each drive electrode and each sense electrode includes a number of first and second conductive regions made of a conductive mesh of lines of conductive material. The first conductive regions have a first mesh density. The second conductive regions have a second mesh density. The first mesh density is greater than the second mesh density. The apparatus also includes one or more crossover areas of the touch sensor. Each crossover area includes at least a portion of a second conductive region of a drive electrode crossing over or under at least a portion of a second conductive region of a sense electrode. Each crossover area has a combined mesh density of the portions of the second conductive regions within it that is substantially equal to the first mesh density.

20 Claims, 8 Drawing Sheets

(56) References Cited

U.S. PATENT DOCUMENTS

| | | |
|---|---|---|
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

UNIFORM-DENSITY COPLANAR TOUCH SENSOR

TECHNICAL FIELD

This disclosure generally relates to touch sensors.

BACKGROUND

A touch position sensor may detect the presence and location of a touch or the proximity of an object (such as a user's finger or a stylus) within a touch-sensitive area of the touch sensor overlaid on a display screen, for example. In a touch-sensitive display application, the touch position sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch position sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
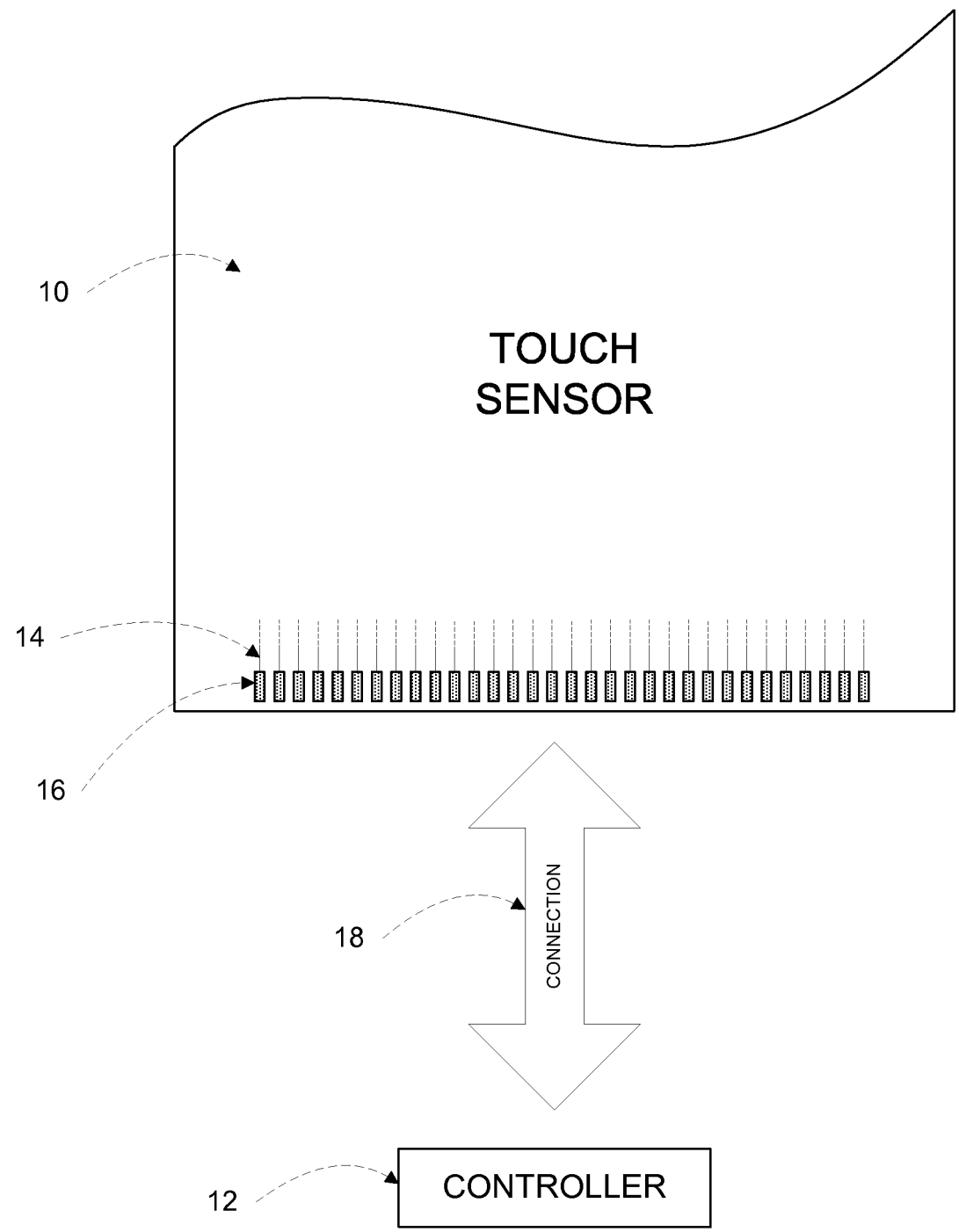
FIG. 1 illustrates an example touch sensor with an example controller.

FIG. 1 illustrates an example touch sensor 10 with an example controller 12. Herein, reference to a touch sensor may encompass a touch screen, and vice versa, where appropriate. Touch sensor 10 and controller 12 may detect the presence and location of a touch or the proximity of an object within a touch-sensitive area of touch sensor 10. Herein, reference to a touch sensor may encompass both the touch sensor and its controller, where appropriate. Similarly, reference to a controller may encompass both the controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, other suitable shape, or suitable combination of these. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy approximately 5of the area of its shape, as described below. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

One or more portions of the substrate of touch sensor 10 may be made of polyethylene terephthalate (PET) or another suitable material. In particular embodiments, the substrate may be made using substantially flexible material, such that structural integrity of the substrate is maintained after significant deformation. As an example and not by way of limitation, a substrate made of substantially flexible material may enable one or more portions of the flexible substrate to wrap around an edge of a surface. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes) or a thin coating of a dielectric material. The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs)—such as for example general-purpose microprocessors, microcontrollers, programmable logic devices (PLDs) or arrays (PLAs), application-specific ICs (ASICs)—on a flexible printed circuit (FPC) bonded to the substrate of touch sensor 10, as described below. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 microns (μm) or less. As another example, the conductive material of tracks 14 may be silver or silver-based and have a width of approximately 100 μm or less. In particular embodiments, tracks 14 may be made of ITO in whole or in part, in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include a FPC. This disclosure contemplates any suitable connection 18 between touch-sensor controller 12 and touch sensor 10.

Figure 2A:
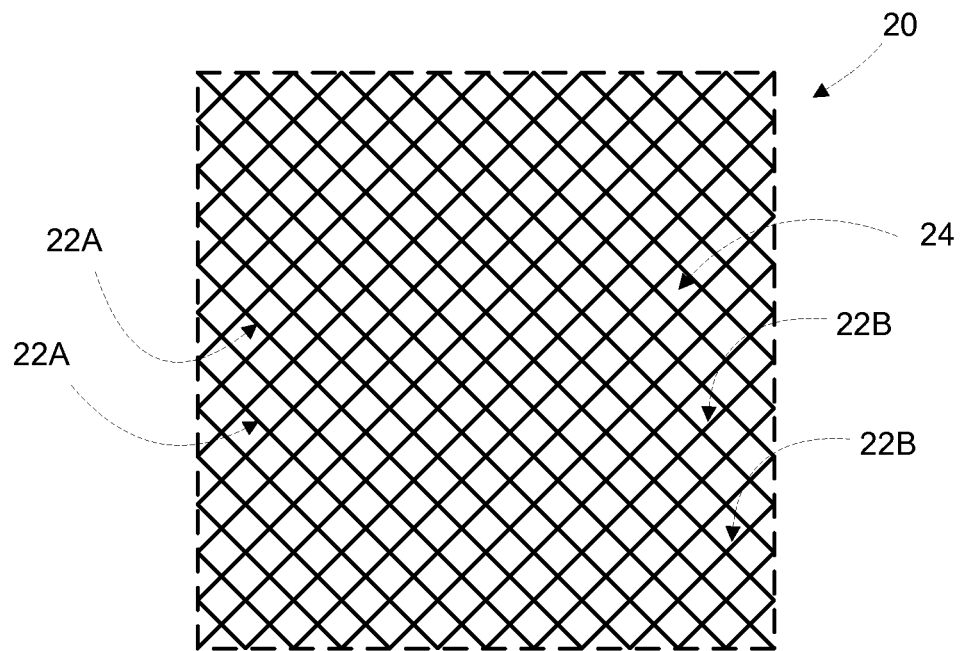
FIGS. 2A-C illustrate example mesh patterns.
Figure 2B:
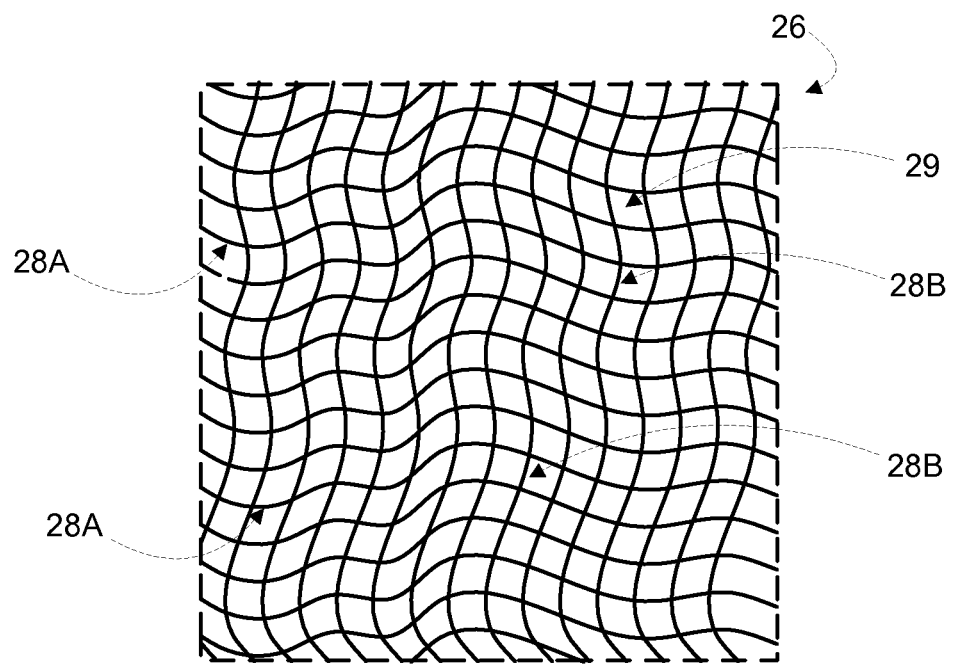
Figure 2C:
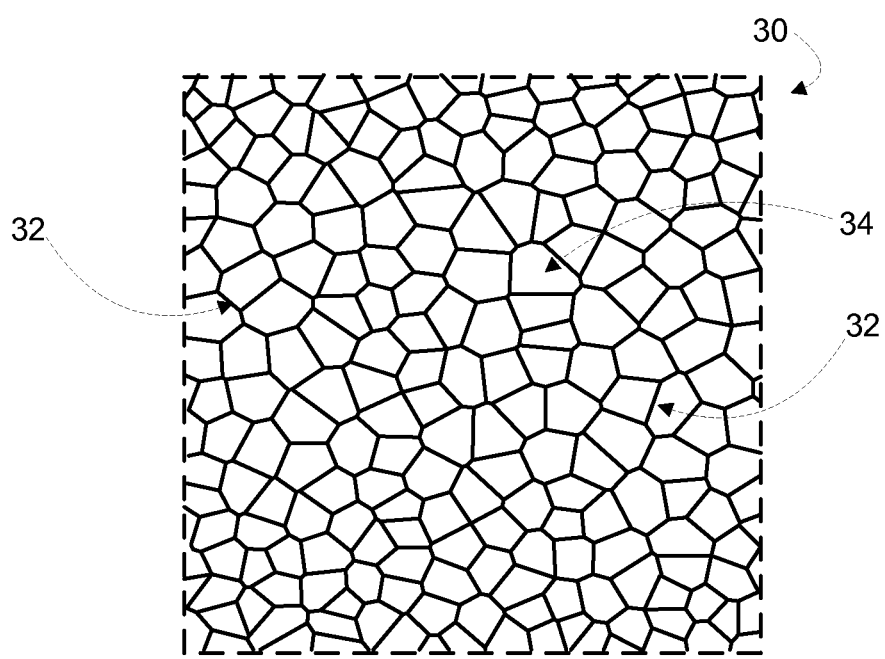

FIGS. 2A-C illustrate example mesh patterns of a touch-sensitive layer. One or more cuts in the example mesh patterns of FIGS. 2A-C may (at least in part) form one or more conductive regions (e.g. electrode or fills) of the touch sensor, and the area of the conductive regions may (at least in part) be bounded by those cuts. The example mesh patterns of FIGS. 2A-C may be made from lines of metal (e.g., gold, aluminum, copper, silver, or gold-, aluminum-, copper- or silver-based material or carbon nanotubes) or other conductive material. In the example of FIG. 2A, an example mesh pattern 20 may be formed from substantially linear lines 22A-B of conductive material. Mesh pattern 20 may be formed using two sets of substantially parallel lines 22A-B of conductive material with orientation shifted by approximately 90°. As an example and not by way of limitation, the sets of conductive lines 22A-B may have intersections that form an array of diamond-shaped mesh cells 24 or micro-features of mesh pattern 20. In particular embodiments, reference to diamond shaped may encompass any suitable quadrilateral shape with opposing pairs of angles being substantially equal angled, such as for example 90° or any suitable angle. Herein, reference to a micro-feature of the mesh pattern may refer any shape, such as for example a diamond or an irregular shape, formed by one or more intersections of lines of conductive material within the mesh pattern. As another example, the sets of conductive lines 22A-B may have substantially orthogonal intersections that form substantially square micro-features with the dimensions formed from the intersections being substantially equal or substantially rectangular micro-features with a dimension formed from the intersections in a first direction being different than a dimension in a second direction.

In the example of FIG. 2B, mesh pattern 26 may be formed from sets of substantially non-linear conductive lines 28A-B with differing orientations. In particular embodiments, non-linear conductive line 28A-B patterns may be used to avoid long linear stretches of conductive metal with a repeat frequency, thereby reducing a probability of causing interference or moiré patterns. The pattern of non-linear conductive lines 28A-B of mesh pattern 26 may disperse and hence reduce the visibility of reflections from conductive lines 28A-B when illuminated by incident light. As an example and not by way of limitation, each of conductive lines 28A-B of mesh pattern 26 may have a substantially sinusoidal shape. The sets 28A-B of non-linear conductive lines may have substantially non-orthogonal intersections that form an array of mesh cells 29 or micro-features within mesh pattern 26. Although this disclosure describes or illustrates particular conductive lines having a particular type of path, this disclosure contemplates conductive lines following any variation in line direction or path from a straight line, including, but not limited to, wavy lines or zig-zag lines.

In the example of FIG. 2C, mesh pattern 30 may be made from randomized micro-features. Substantially randomized conductive line 32 patterns may to avoid stretches of conductive metal with a repeat frequency, reducing a probability of causing interference or moiré patterns. In particular embodiments, mesh pattern 30 substantially embodies a Voronoi diagram, with notional seeds (not shown) corresponding to Voronoi sites within mesh cells 34 or micro-features corresponding to Voronoi cells. As an example and not by way of limitation, every point along each conductive line 32 may be substantially equidistant from its two closest notional seeds. The notional seeds do not correspond to any material (conductive or otherwise) in the touch sensor and the notional seeds serve to determine the randomized arrangement of conductive lines 32. Moreover, randomized micro-features of mesh pattern 30 may not substantially repeat with respect to an orientation of the touch sensor (such as horizontal, vertical, or angled).

Although this disclosure describes or illustrates particular mesh patterns (e.g. 20, 26, and 30), this disclosure contemplates any suitable mesh pattern formed using any suitable conductive material having any suitable configuration. Conductive lines (e.g. 22A or 32) of conductive mesh patterns (e.g. 20, 26, and 30) may occupy substantially all or a portion of the surface area of a conductive region in a hatched, mesh, or other suitable pattern. Herein, reference to mesh density may refer to the amount of conductive material per unit of surface area of a conductive region or electrode. In particular embodiments, mesh density may refer to a percentage of area with fill or conductive lines relative to the total surface area of an electrode. As an example and not by way of limitation, the conductive lines (e.g. 22A or 32) may have a mesh density of less than approximately 10% of a surface area of the electrode. Thus, the contribution of the conductive lines to the attenuation of light through mesh pattern (e.g. 20, 26, and 30) may be within a range of approximately 1% to approximately 10%. Accordingly, although conductive lines (e.g. 22A or 32) may be opaque, the combined optical transmittance of electrodes formed using mesh pattern (e.g. 20, 26, and 30) may be approximately 90% or higher, ignoring a reduction in transmittance due to other factors such as the substrate material.

Figure 3A:
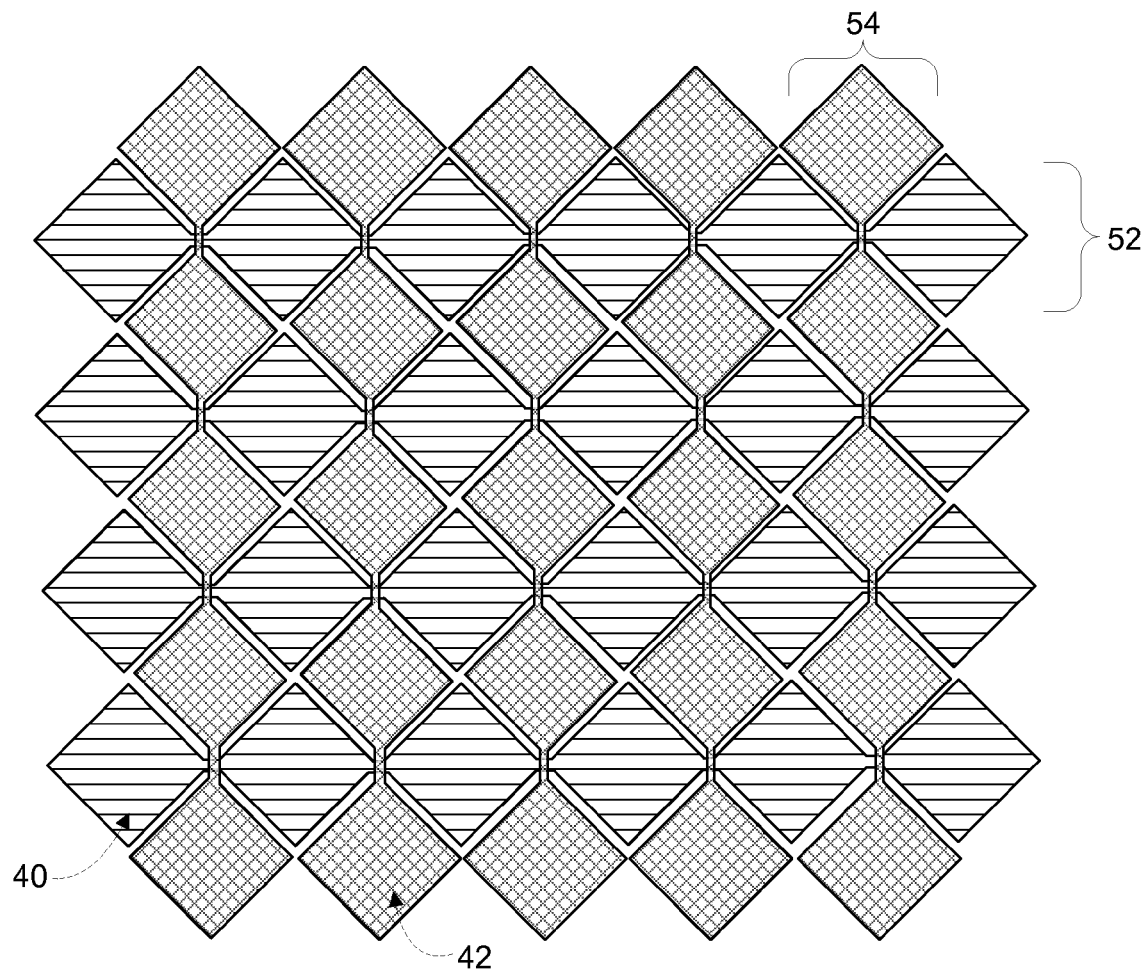
FIGS. 3A-B illustrate plan views of example electrode patterns.

FIG. 3A illustrates a plan view of an example diamond electrode pattern. One or more shapes or macro-features of conductive regions 40 and 42 of electrodes 52 and 54 may be formed using an example mesh pattern described and illustrated in the example of FIGS. 2A-C. Herein, reference to a macro-feature of conductive regions refers to the shape of conductive regions bounded at least in part by cuts in the lines of conductive material of the mesh pattern. In particular embodiments, reference to diamond shaped, as described above, may be applied to both micro-features and macro-features of any suitable conductive region, as appropriate. As an example and not by way of limitation, cuts in the mesh pattern may be used to form substantially square or other suitably shaped macro-features of conductive regions 40 and 42. In the example of FIG. 3A, one or more electrodes 52 are formed from two or more conductive regions 40 interconnected in a first direction. One or more electrodes 54 are formed from two or more conductive regions 42 interconnected in a second direction that is substantially perpendicular to the first direction. Each electrode, e.g. 52, is separated from adjacent electrodes, e.g. 52, oriented in the same direction by a gap in the conductive material. In particular embodiments, electrodes 52 with conductive regions 40 interconnected in the first direction may function as drive electrodes and electrodes 54 with conductive regions 42 interconnected in the second direction may function as sense electrodes. Although this disclosure describes particular electrodes having a particular function, this disclosure contemplates any suitable electrodes having any suitable function. In particular embodiments, electrodes 52 are formed using a single layer of conductive material on a first single plane and electrodes 54 are formed using a single layer of conductive material on a second plane, separated by a thickness of a substrate. In other particular embodiments, both electrodes 52 and 54 may be formed using a single layer of conductive material on the same plane.

Figure 3B:
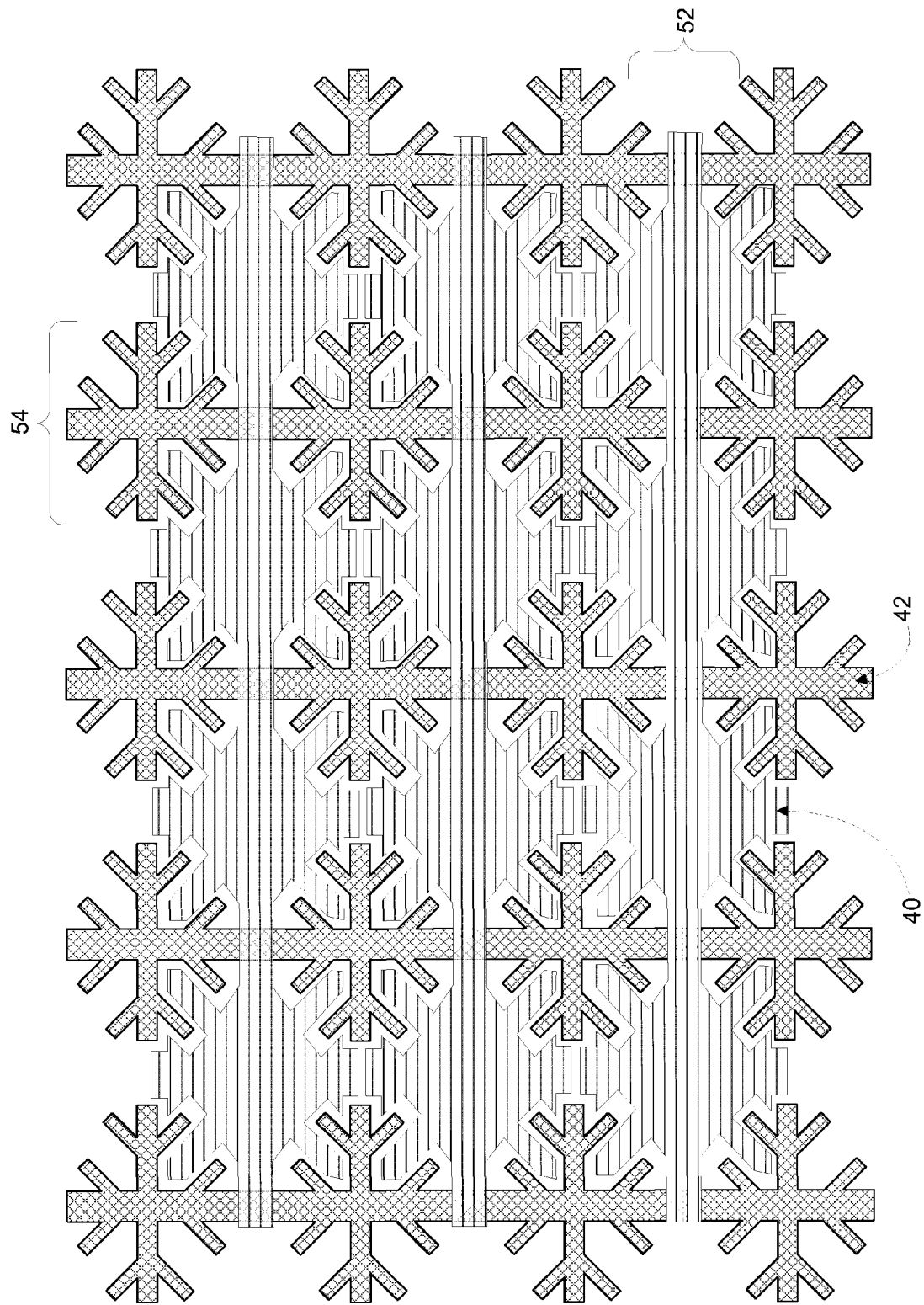

FIG. 3B illustrates a plan view of a snowflake electrode pattern. Cuts in the mesh pattern may be used to form conductive regions 40 with substantially diamond-shaped macro-features and conductive regions 42 with macro-features comprising a substantially rectangular-shaped portion and a cross portion substantially perpendicular to the substantially rectangular-shaped portion. In particular embodiments, cuts in the mesh pattern are used to form projections extending from each side of diamond-shaped conductive region 40. Moreover, cuts in the mesh pattern are used to form projections extending from the substantially rectangular shaped and cross portion of conductive region 42. The combination of electrodes 40 and 42 with projections may be referred to as interdigitated or interleaved projections. The interleaved projections increase the adjacent perimeters of electrodes 52 and 54. Although this disclosure describes or illustrates electrodes formed with conductive regions with particularly shaped macro-features, this disclosure contemplates conductive regions with any suitably shaped macro-features, including, but not limited to, squares or rectangles.

In the example of FIG. 3B, one or more electrodes 52 are formed from two or more conductive regions 40 interconnected in a first direction. One or more electrodes 54 formed from two or more conductive regions 42 interconnected in a second direction that is substantially perpendicular to the first direction. As described above, each electrode, e.g. 52, is separated from adjacent electrodes, e.g. 52, oriented in the same direction by a gap in the conductive material. In particular embodiments, electrodes 52 formed from conductive regions 40 interconnected in the first direction may function as drive electrodes and electrodes 54 formed from conductive regions 42 interconnected in the second direction may function as sense electrodes. Although this disclosure describes particular electrodes having a particular function, this disclosure contemplates any suitable electrodes having any suitable function. As described above, electrodes 52 may be formed using a single layer of conductive material on the single plane of a substrate. Electrodes 54 may be formed using a single layer of conductive material on a second plane of the substrate with the thickness of the substrate separating electrodes 52 from electrodes 54. In particular embodiments, both electrodes 52 and 54 may be formed using a single layer of conductive material on a single plane of the substrate.

Figure 4A:
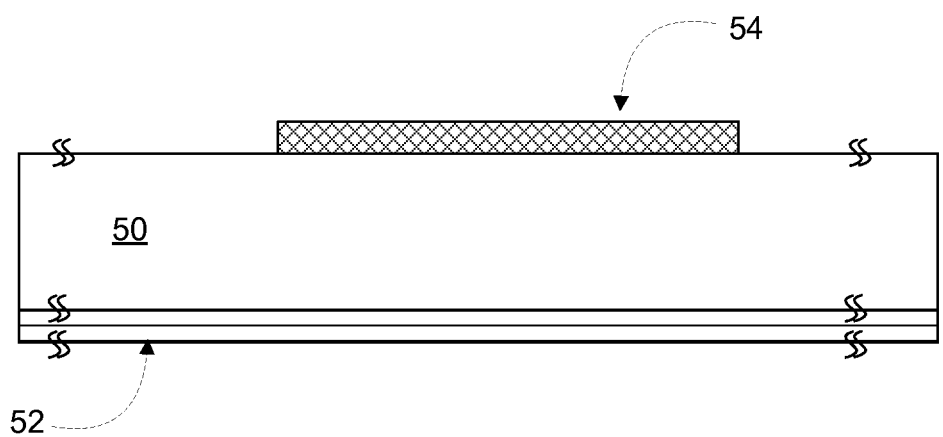
FIG. 4A illustrates an example cross-section of an example touch sensor with example crossover areas.

FIG. 4A illustrates an example cross-section of an example touch sensor with example crossover areas. In the example of FIG. 4A, electrodes 52 are formed from conductive regions interconnected in a first direction on a first plane of a substrate 50 and electrodes 54 are formed from conductive regions interconnected in a second direction on a second plane of substrate 50. In particular embodiments, electrodes 52 interconnected in the first direction are spatially separated from electrodes 54 interconnected in the second direction, by the thickness of substrate 50. As described above, electrodes 52 with conductive regions interconnected in the first direction may function as drive electrodes and electrodes 54 with conductive regions interconnected in the second direction may function as sense electrodes. Although this disclosure describes particular electrodes having a particular function and configuration on the substrate, this disclosure contemplates any suitable electrodes having any suitable function and configuration on the substrate.

Figure 4B:
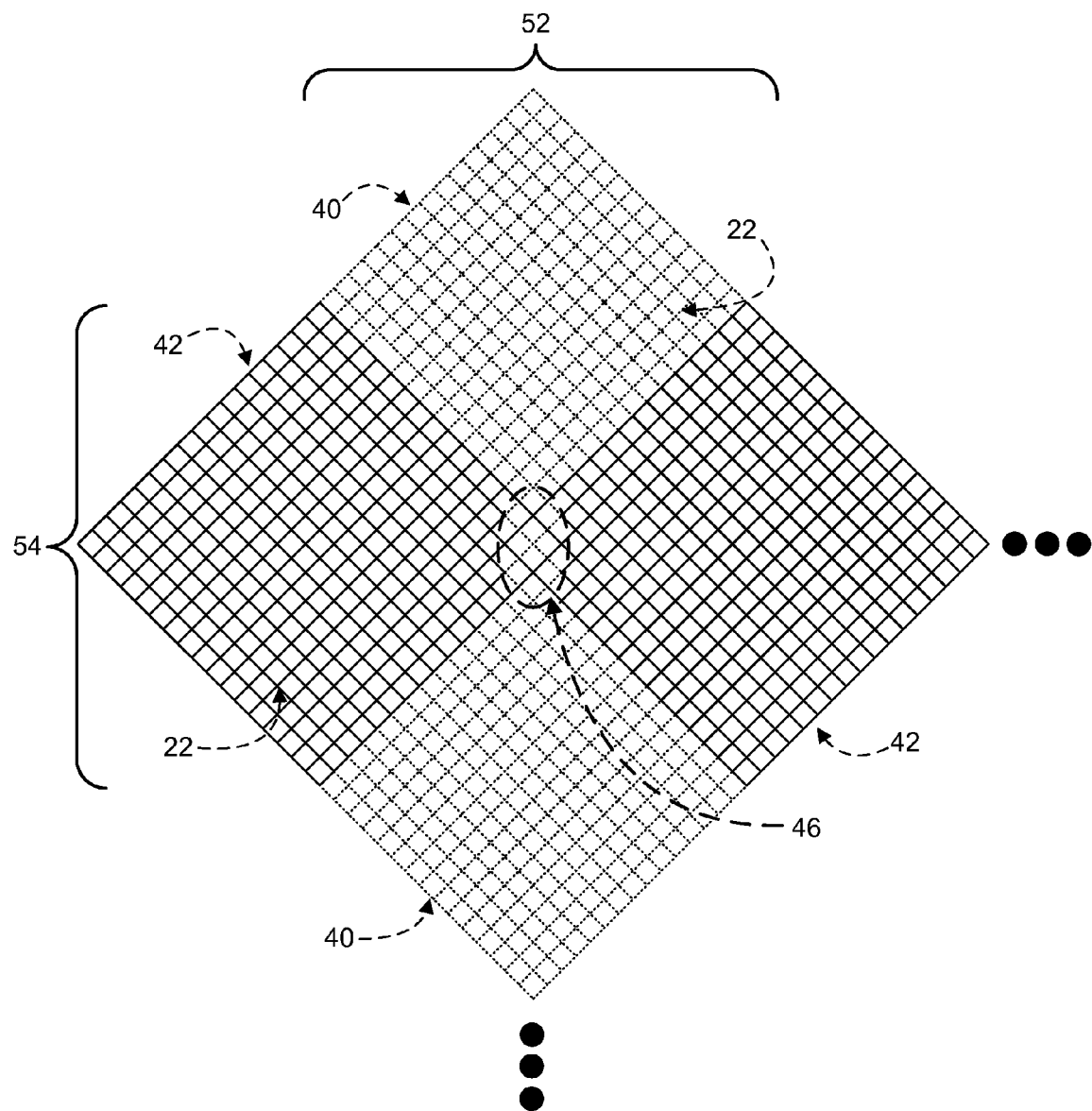
FIG. 4B-C illustrate plan views of an example touch sensor with example micro-features and example crossover areas.
Figure 4C:
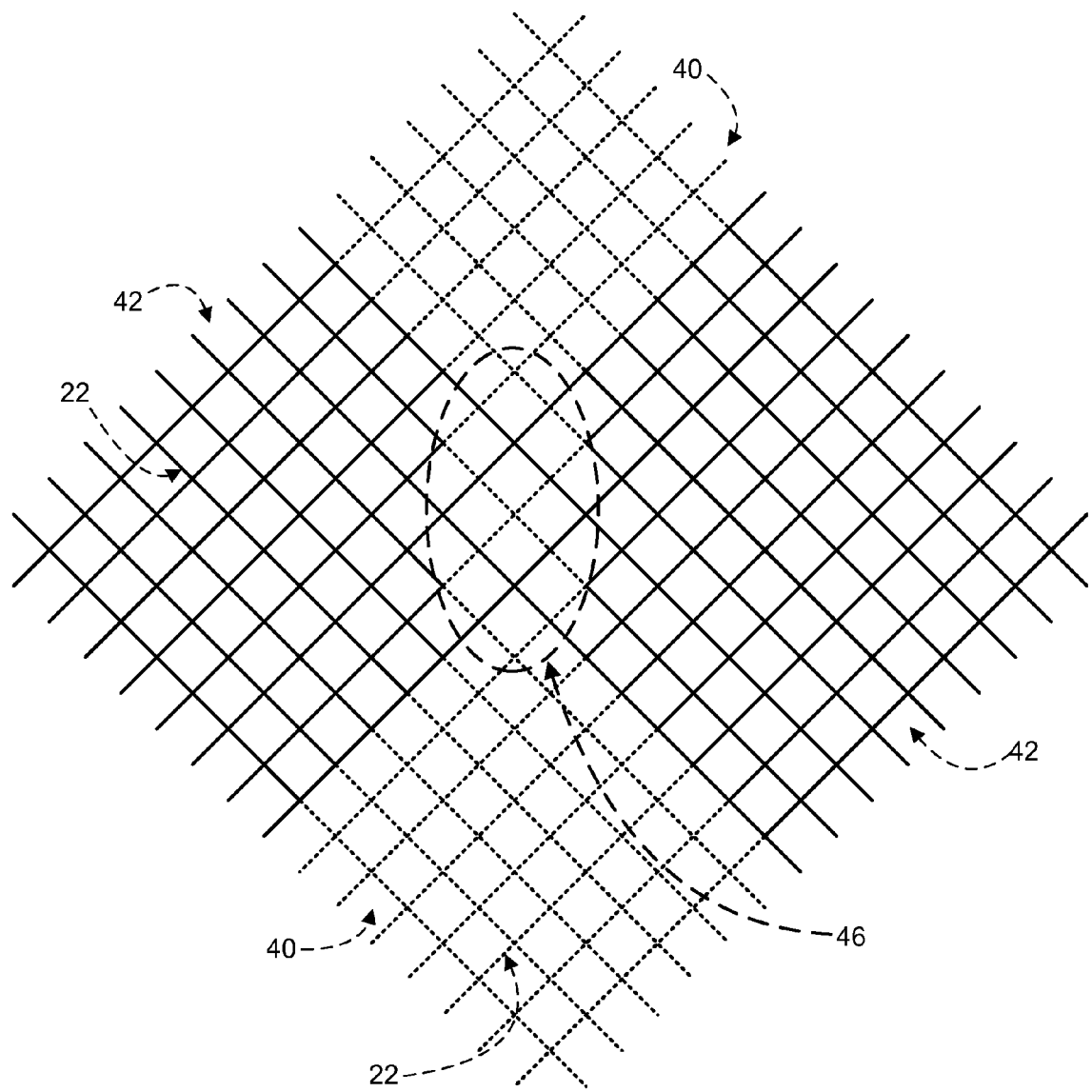

FIGS. 4B-C illustrate a plan view of an example touch sensor with example micro-features and example crossover areas. In the example of FIG. 4B, conductive regions 40 of electrodes 52 are interconnected in a first direction and conductive regions 42 of electrodes 54 are interconnected in a second direction. As described above, reference to a micro-feature of conductive regions 40 and 42 refers to any shape formed by intersections of the conductive lines within conductive regions 40 and 42 and the micro-features may have characteristics that are independent of the characteristics of the macro-features of conductive regions 40 and 42. A portion of the macro-features of conductive regions 40 may cross over or under a portion of the macro-features of conductive regions 42 to form a crossover area 46. In particular embodiments, the size of the micro-features of the portions of conductive regions 40 and 42 without crossover area 46 may differ from the size of the micro-features of the portions of conductive regions 40 and 42 within crossover area 46. As an example and not by way of limitation, the micro-features of the portions of conductive regions 40 and 42 outside crossover area 46 may be half the size of the micro-features of the portions of conductive regions 40 and 42 within crossover area 46. In other words, a substantially square-shaped micro-feature of the portion of conductive regions 40 and 42 without crossover area 46 may be half the size of a substantially square-shaped micro-feature of the portion of conductive regions 40 and 42 within crossover area 46.

FIG. 4C illustrates an expanded view of example crossover area 46 with example micro-features. In example of FIG. 4C, the variation of the size of the micro-features of conductive regions 40 and 42 may be performed by varying the mesh density within conductive regions 40 and 42, while maintaining a substantially constant width of conductive lines 22 of the mesh pattern throughout the expanse of the touch sensor. As an example and not by way of limitation, the number of conductive lines per unit surface area of the portion of conductive regions 40 and 42 within crossover area 46 may vary relative to the number of conductive lines per unit surface area of the portion of conductive regions 40 and 42 outside crossover area 46. In particular embodiments, the mesh density of the portions of conductive regions 40 and 42 without crossover area 46 may be substantially equal to the combined mesh density of the portions of conductive regions 40 and 42 within crossover area 46. Although this disclosure illustrates and describes particular variations between the portions of the conductive regions within and without a crossover area, this disclosure contemplates any suitable variation between the portions of the conductive regions within and without the crossover area. Furthermore, although this disclosure illustrates and describes particularly-shaped conductive regions formed using a particular mesh pattern, this disclosure contemplates conductive regions having any suitable shape formed using any suitable mesh pattern.

Herein, reference to a computer-readable storage medium may include a semiconductor-based or other IC (such, as for example, a field-programmable gate array (FPGA) or an ASIC), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable storage medium, or a suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   one or more drive electrodes and one or more sense electrodes of a touch sensor, each drive electrode and each sense electrode comprising a plurality of first and second conductive regions made of a conductive mesh of lines of conductive material, the first conductive regions comprising a first mesh density, the second conductive regions comprising a second mesh density, the first mesh density being greater than the second mesh density; and
   one or more crossover areas of the touch sensor, each crossover area comprising at least a portion of a second conductive region of a drive electrode crossing over or under at least a portion of a second conductive region of a sense electrode, each crossover area comprising a combined mesh density of the portions of the second conductive regions within it that is substantially equal to the first mesh density.

2. The apparatus of claim 1, wherein a size of one or more micro-features of the first conductive regions is approximately half a size of one or more micro-features of the second conductive regions.

3. The apparatus of claim 2, wherein the micro-features are substantially diamond shaped.

4. The apparatus of claim 1, wherein one or more micro-features of the conductive regions are substantially diamond shaped.

5. The apparatus of claim 1, wherein the mesh density of the second conductive regions is approximately half the mesh density of the first conductive regions.

6. The apparatus of claim 1, wherein one or more of the drive electrodes is located on an opposite surface of a substrate from one or more of the sense electrodes.

7. The apparatus of claim 1, wherein the drive and sense electrodes are on a same plane with respect to each other.

8. The apparatus of claim 1, wherein the conductive material comprises gold, aluminum, copper, silver, gold-based, aluminum-based, silver-based, or copper-based, or carbon nanotubes.

9. The apparatus of claim 1, wherein drive and sense electrodes are substantially transparent and the conductive material is optically opaque.

10. The apparatus of claim 1, wherein a width of the lines of conductive material is substantially uniform.

11. A device comprising:
    a touch sensor comprising:
       one or more drive electrodes and one or more sense electrodes, each drive electrode and each sense electrode comprising a plurality of first and second conductive regions made of a conductive mesh of lines of conductive material, the first conductive regions comprising a first mesh density, the second conductive regions comprising a second mesh density, the first mesh density being greater than the second mesh density; and
       one or more crossover areas, each crossover area comprising at least a portion of a second conductive region of a drive electrode crossing over or under at least a portion of a second conductive region of a sense electrode, each crossover area comprising a combined mesh density of the portions of the second conductive regions within it that is substantially equal to the first mesh density; and
    a computer-readable non-transitory storage medium embodying logic that is configured when executed to control the touch sensor.

12. The device of claim 11, wherein a size of one or more micro-features of the first conductive regions is approximately half a size of one or more micro-features of the second conductive regions.

13. The device of claim 12, wherein the micro-features are substantially diamond shaped.

14. The device of claim 11, wherein one or more macro-features of the conductive regions are substantially diamond shaped.

15. The device of claim 11, wherein the mesh density of the second conductive regions is approximately half the mesh density of the first conductive regions.

16. The device of claim 11, wherein one or more of the drive electrodes is located on an opposite surface of a substrate from one or more of the sense electrodes.

17. The device of claim 11, wherein the drive and sense electrodes are on a same plane with respect to each other.

18. The device of claim 11, wherein the conductive material comprises gold, aluminum, copper, silver, gold-based, aluminum-based, silver-based, or copper-based, or carbon nanotubes.

19. The device of claim 11, wherein drive and sense electrodes are substantially transparent and the conductive material is optically opaque.

20. The device of claim 11, wherein a width of the lines of conductive material is substantially uniform.

* * * * *